US012663073B1

(12) United States Patent
Bahena et al.

(10) Patent No.: US 12,663,073 B1
(45) Date of Patent: Jun. 23, 2026

(54) LUBRICATION SYSTEM FOR AN AXLE ASSEMBLY

(71) Applicant: Schaeffler Technologies AG & Co. KG, Herzogenaurach (DE)

(72) Inventors: Rodrigo Bahena, Puebla (MX); Jessica Sampieri, Puebla (MX); Rafael Domínguez, Puebla (MX); Sergio Enrique Aguilar, Cholula (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/201,065

(22) Filed: May 7, 2025

(51) Int. Cl.
| | |
|---|---|
| *F16H 57/04* | (2010.01) |
| *F16H 57/02* | (2012.01) |
| *F16H 57/037* | (2012.01) |

(52) U.S. Cl.
CPC ....... *F16H 57/0483* (2013.01); *F16H 57/037* (2013.01); *F16H 57/0423* (2013.01); *F16H 57/045* (2013.01); *F16H 57/0457* (2013.01); *F16H 2057/02034* (2013.01); *F16H 2057/02052* (2013.01)

(58) Field of Classification Search
CPC ............. F16H 57/0483; F16H 57/0423; F16H 57/045; F16H 57/0457; F16H 57/0424
See application file for complete search history.

(56) References Cited

U.S. PATENT DOCUMENTS 8,382,628 B2 * 2/2013 Hilker ................. F16H 57/0483
475/160

FOREIGN PATENT DOCUMENTS

CN        108292881 B        3/2020

* cited by examiner

*Primary Examiner* — Huan Le
(74) *Attorney, Agent, or Firm* — Price Heneveld LLP

(57) ABSTRACT

An axle assembly for a vehicle includes a differential including a drive gear rotatable about an axis and a differential case coupled with the drive gear and defining a gear interaction space. A housing includes a differential portion having a proximal portion in which the drive gear is housed, a first distal portion extending in a first axial direction from the proximal portion, and a second distal portion extending in a second axial direction from the proximal portion. The differential portion defines space. A fluid flow path extends from a sump, circumferentially between the drive gear and the proximal portion and to a cavity, from the cavity in the first axial direction into a first chamber, and from the first chamber in the second axial direction into the gear interaction space.

20 Claims, 7 Drawing Sheets

LUBRICATION SYSTEM FOR AN AXLE ASSEMBLY

FIELD OF THE DISCLOSURE

The present disclosure generally relates to a lubrication system for an axle assembly. More particularly, the present disclosure relates to an axle assembly having a housing and a differential that interacts with the housing to move fluid in the housing.

BACKGROUND OF THE DISCLOSURE

Lubrication systems for axle assemblies are known, typically employing a pump to pressurize oil and ensure effective fluid distribution.

SUMMARY OF THE DISCLOSURE

According to a first aspect of the present disclosure, an axle assembly for a vehicle includes a differential including a drive gear rotatable about an axis and a differential case coupled with and radially inboard of the drive gear and defining a gear interaction space extending axially between a first axial position and a second axial position. A housing includes a differential portion having a proximal portion in which the drive gear is housed, a first distal portion extending in a first axial direction from the proximal portion, and a second distal portion extending in a second axial direction from the proximal portion. The differential portion defines a sump in the proximal portion and disposed radially outboard of the drive gear, a cavity in the proximal portion and radially opposite of the sump, a first chamber extending in the first axial direction to a third axial position spaced distally from the first axial position, and a second chamber extending in the second axial direction to a fourth axial position spaced distally from the second axial position. The differential portion and the differential form a fluid flow path extending from the sump, circumferentially between the drive gear and the proximal portion and to the cavity, from the cavity in the first axial direction into the first chamber, and from the first chamber in the second axial direction into the gear interaction space.

Embodiments of the first aspect of the disclosure can include any one or a combination of the following features:

the proximal portion and the drive gear define an outer space therebetween, wherein rotation of the drive gear causes fluid in the sump to move through the outer space and into the cavity;

a catcher ring adjacent to the differential case, wherein the differential case defines a passage through which the fluid flow path extends between the first chamber and the gear interaction space, wherein the catcher ring engages the passage;

the differential portion is configured to be supported by the vehicle in an orientation such that the sump is disposed below the axis for collecting fluid;

a motor and a drive portion coupled with the differential housing and in which a gear assembly is disposed, wherein operation of the motor causes rotation of the differential via operation of the gear assembly;

the differential portion and the drive housing cooperate to form a floor and a ceiling opposite the floor, and comprising a guide extending circumferentially from the floor about the axis between the drive portion and the differential portion;

the first chamber narrows from the cavity to a first distal end and the second chamber narrows from the cavity to a second distal end;

the differential portion includes a ledge extending from the first distal end and tapering toward the differential case to guide fluid radially inwardly in the second axial direction to the differential case;

a first plane passes through the axis, the sump, and the cavity, and wherein a second plane is orthogonal to the first plane and passes through the axis, the second plane dividing the differential portion into a first side in which the sump is disposed and a second side in which the cavity, the first chamber, and the second chamber are disposed;

the differential portion includes a first protruding portion radially opposite the first chamber and a second protruding portion radially opposite the second chamber, each protruding portion disposed on the first side of the differential portion; and the first and second protruding portions define axial limits of the sump such that oil in the sump is configured to move out of the sump via circumferential displacement.

According to a second aspect of the present disclosure, an axle assembly includes a motor, a differential including a drive gear rotatable about an axis and a differential case radially inboard of the drive gear defining a gear interaction space inside the differential case and extending between a first axial position and a second axial position, a gear assembly operably coupled with the motor, and a housing. The housing includes a drive portion in which the gear assembly is disposed. Operation of the motor causes rotation of the differential via operation of the gear assembly. The housing includes a differential portion having a proximal portion in which the drive gear is housed. The differential portion defines a sump in the proximal portion and disposed radially outboard of the drive gear, a cavity in the proximal portion and radially opposite of the sump, a first chamber extending from the cavity in a first axial direction to a third axial position spaced distally from the first axial position, and a second chamber extending from the cavity in a second axial direction to a fourth axial position spaced distally from the second axial position. The differential portion and the differential form a fluid flow path extending from the sump, circumferentially between the drive gear and the proximal portion and to the cavity, from the cavity in the first axial direction into the first chamber, and from the first chamber in the second axial direction into the gear interaction space.

Embodiments of the second aspect of the disclosure can include any one or a combination of the following features:

the proximal portion and the drive gear define an outer space therebetween, wherein rotation of the drive gear causes fluid in the sump to move through the outer space and into the cavity;

a catcher ring adjacent to the differential case, wherein the differential case defines a passage through which the fluid flow path extends between the first chamber and the gear interaction space, wherein the catcher ring partially engages the passage;

the differential portion includes a first distal portion extending in a first axial direction from the proximal portion and a second distal portion extending in a second axial direction from the proximal portion, wherein the first chamber narrows from the cavity toward a first distal end and the second chamber narrows from the cavity toward a second distal end;

the differential portion includes a ledge extending from the first distal end and tapering toward the differential case to guide fluid radially inwardly in the second axial direction to the differential case;

a first plane passes through the axis, the sump, and the cavity, and wherein a second plane is orthogonal to the first plane and passes through the axis, the second plane dividing the differential portion into a first side in which the sump is disposed and a second side in which the cavity, the first chamber, and the second chamber are disposed;

the differential portion includes a first protruding portion radially opposite the first chamber and a second protruding portion radially opposite the second chamber, each of the protruding portions disposed on the first side of the differential portion; and the first and second protruding portions define axial limits of the sump such that oil in the sump is configured to move into or out of the sump via circumferential displacement.

According to a third aspect of the present disclosure, an axle assembly for a vehicle includes a differential including a drive gear rotatable about an axis and a differential case coupled with the drive gear and defining a gear interaction space inside the differential case and a housing in which the drive gear is housed and including a ledge. The housing defines a sump disposed radially outboard of the drive gear, a cavity opposite the sump, and a chamber extending in a first axial direction and narrowing from the cavity toward a distal end of the housing. The ledge extends from the distal end and tapers radially inwardly in a second axial direction opposite the first axial direction from the distal end toward the differential case to guide fluid toward the differential case.

These and other features, advantages, and objects of the present disclosure will be further understood and appreciated by those skilled in the art by reference to the following specification, claims, and appended drawings.

DETAILED DESCRIPTION

Figure 1:
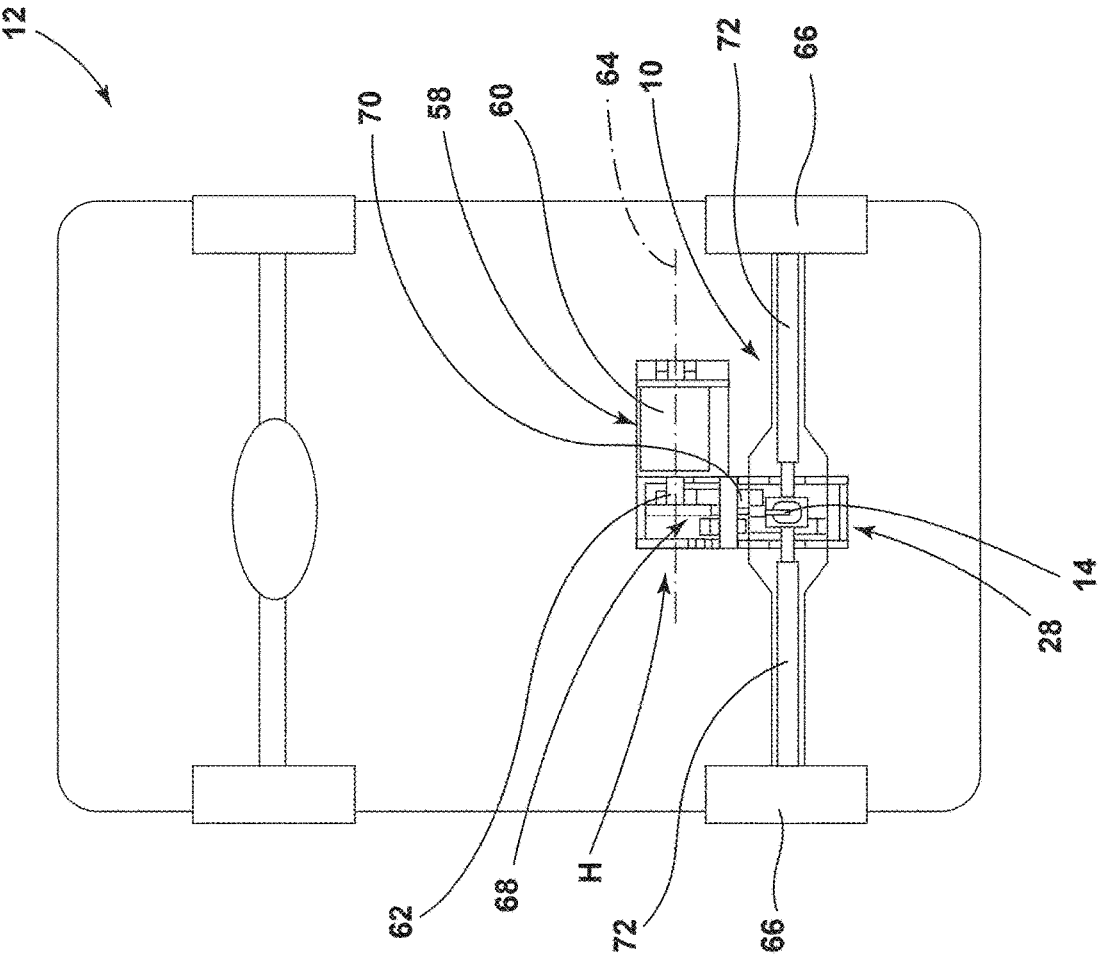
FIG. 1 is a schematic view of a vehicle incorporating an electric axle assembly.
Figure 2:
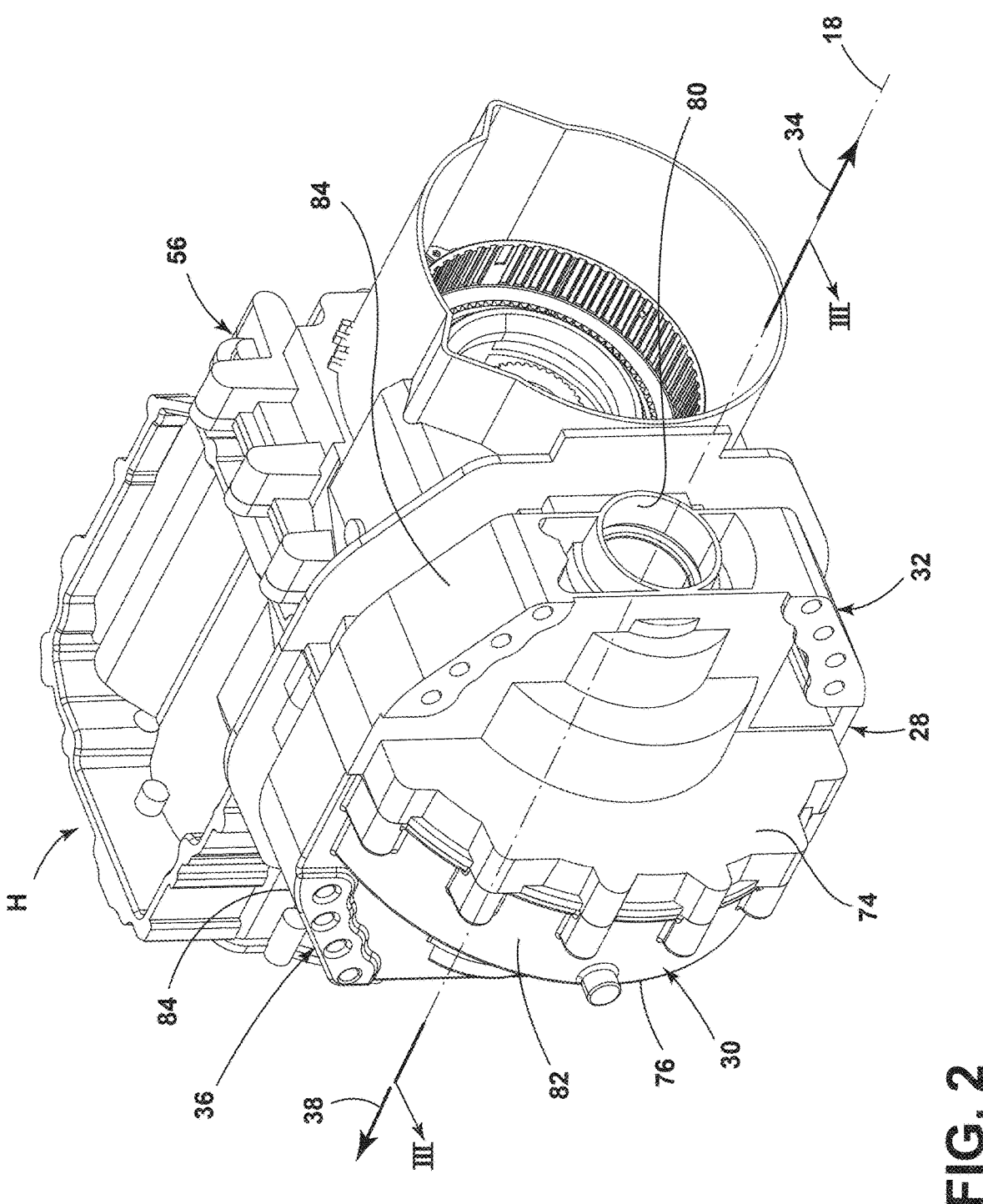
FIG. 2 is a perspective view of a portion of an axle assembly.

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a shaft configured to rotate in operation of the apparatus described herein. Further, the term "radial" and derivatives thereof, such as "radially," shall be understood in relation to the axis of the aforementioned shaft. For example, "radially outboard" refers to further away from the axis, while "radially inboard" refers to nearer to the axis. The term "circumferential" and derivatives thereof, such as "circumferentially," shall be understood in relation to the axis of the aforementioned shaft.

Referring to FIGS. 1-7, an axle assembly 10 for a vehicle 12 includes a differential 14 including a drive gear 16 rotatable about an axis 18. The differential 14 includes a differential case 20 coupled with and radially inboard of the drive gear 16. The differential 14 defines a gear interaction space 22 extending axially between a first axial position 24 and a second axial position 26. A housing H includes a differential portion 28 having a proximal portion 30 in which the drive gear 16 is housed, a first distal portion 32 extending in a first axial direction 34 from the proximal portion 30, and a second distal portion 36 extending in a second axial direction 38 from the proximal portion 30. The differential portion 28 defines a sump 40 in the proximal portion 30 and disposed radially outboard of the drive gear 16. The differential portion 28 also defines a cavity 42 in the proximal portion 30 and radially opposite of the sump 40. The differential portion 28 also defines a first chamber 44 extending in the first axial direction 34 to a third axial position 46 spaced distally from the first axial position 24. The differential portion 28 also defines a second chamber 48 extending in the second axial direction 38 to a fourth axial position 50 spaced distally from the second axial position 26. The differential portion 28 and the differential 14 cooperate to form a fluid flow path 52. The fluid flow path 52 extends from the sump 40, circumferentially between the drive gear 16 and the proximal portion 30 and to the cavity 42, from the cavity 42 in the first axial direction 34 into the first chamber 44, and from the first chamber 44 in the second axial direction 38 into the gear interaction space 22.

In general, the arrangement of the differential 14 and the differential portion 28 can provide for circumferential movement of fluid around the differential 14 during operation of the differential 14 to thereby enhance lubrication efficiency and reduce reliance on additional components such as pumps. For example, torque provided by the differential 14 can, in effect, pressurize oil between the drive gear 16 and the housing H and provide a spiraling effect for oil to move to distal parts of the housing H and into the differential 14. A passive oil system employed herein can utilize the natural movement and gravity-driven distribution of oil within the axle assembly 10 instead of using a pump. The system can be designed to gradually spread lubricant across components as the vehicle 12 operates. By harnessing motion and heat, the passive system described herein can effectively maintain lubrication without (or with limited) the need for additional energy input.

Referring now to FIG. 1, a vehicle 12 is illustrated. The vehicle 12 may be an electric vehicle and/or a hybrid electric vehicle. In the embodiment illustrated in FIG. 1, the axle assembly 10 is an electric axle assembly. The axle assembly 10 can include a housing H having a differential portion 28 and a drive portion 56. The differential portion 28 and the drive portion 56 can be formed of a common housing having a portion for housing the differential 14 (the differential portion 28) and a portion for housing a gear assembly that drives the differential 14 (the drive portion 56). The axle assembly 10 can include an electric drive unit 58, at least a portion of which can be disposed in the drive portion 56. The electric drive unit 58 can include a motor 60. The motor 60 can include a stator and a rotor (not shown) and may be configured to drive rotation of a rotor shaft 62 about a drive axis 64. In various implementations, the rotor shaft 62 is operably coupled with at least one wheel 66 of the vehicle 12 such that rotation of the rotor shaft 62 drives rotation of the at least one wheel 66. In various implementations, the electric drive unit 58 of the vehicle 12 includes a gear system 68. In the exemplary embodiment illustrated in FIG. 1, a transmission 70 and the differential 14 are operably coupled with the rotor shaft 62. The differential 14 is configured to be operably coupled with shafts 72 which are operably coupled with wheels 66 of the vehicle 12. As such, rotation of the rotor shaft 62 by the electric motor 60 may drive rotation of the shafts 72, which may be half-shafts, and the attached wheels 66 of the vehicle 12 via the operable coupling of the shafts 72 to the rotor shaft 62 by the gear system 68. With continued reference to FIGS. 1 and 2, in various implementations, the differential portion 28 and the drive portion 56 are formed via a pair of shells 74, 76, such as a first shell 74 and a second shell 76, that oppose one another. The shells 74, 76 are coupled to one another to define an interior 78 in which the differential 14 and the gear system 68 are disposed. In various implementations, the housing H can be die-cast aluminum formed of a plurality of components that are fastened to each other.

Referring now to FIGS. 2-7, the differential 14 can be disposed on the axis 18 within the housing H. The differential 14 can operably couple with the shafts 72 that are received in openings 80 defined by the differential portion 28. The interior 78 can be sealed via seals (not shown) that extend annularly between the differential portion 28 and the shafts 72. The differential portion 28 includes a central wall 82 that extends circumferentially about the axis 18 and outer walls 84 that extend axially from the central wall 82. The sump 40 and the cavity 42 can be disposed on opposite sides of the differential portion 28. For example, a first plane can pass through the axis 18, the sump 40, and the cavity 42, and a second plane is orthogonal to the first plane and passes through the axis 18. The second plane divides the differential portion 28 into a first side 86 in which the sump 40 is disposed and a second side 88 in which the cavity 42, the first chamber 44, and the second chamber 48 are disposed. The first side 86 can be a lower portion of the differential portion 28, and the second side 88 can be an upper portion of the differential portion 28. For example, the differential portion 28 may be configured to be supported by the vehicle 12 in an orientation such that the sump 40 is disposed below the axis 18 for collecting fluid. In this way, fluid can accumulate in the sump 40 when the differential 14 is not in use. In general, the geometry of the housing H, including the spaces between the differential 14 and the housing H described herein can allow the fluid system to operate passively (e.g., without a pump).

Figure 3:
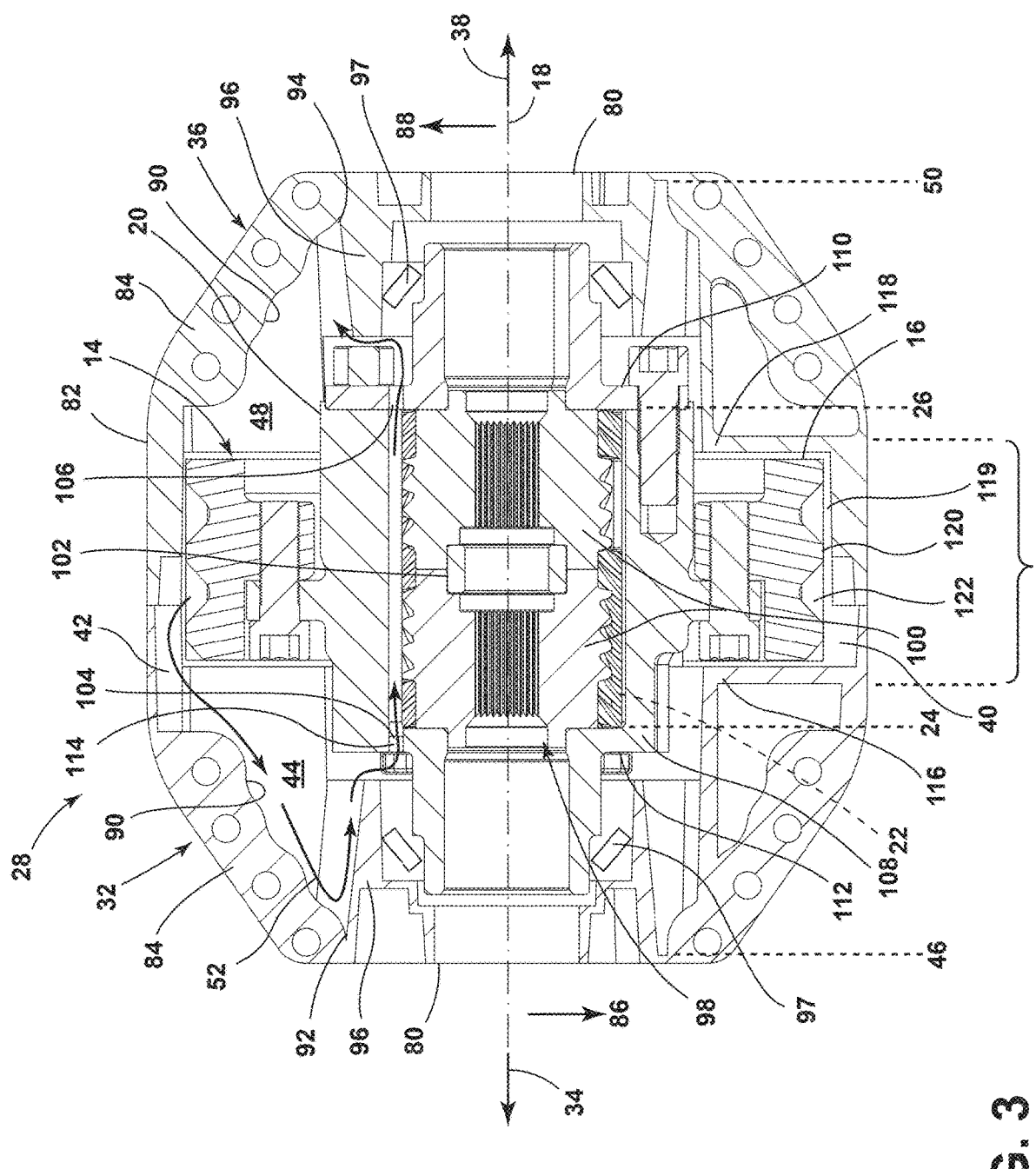
FIG. 3 is a cut-away view of the portion of the axle assembly of FIG. 2 taken at the plane III-III.

The first and second chambers 44, 48 disposed in the second side 88 of the differential portion 28 can be defined by first and second outer walls 84, respectively. Each outer wall 84 can form an inner surface 90 having an arcuate contour that extends radially inwardly and axially. As shown in FIG. 3, the first chamber 44 extends in a first axial direction 34 and narrows from the cavity 42 toward a first distal end 92, and the second chamber 48 extends in the second axial direction 38 and narrows from the cavity 42 toward a second distal end 94. The first chamber 44 axially tapers in the second axial direction 38 from the first distal end 92 toward the differential case 20 to guide fluid radially inwardly in the second axial direction 38 to the differential case 20. The first axial direction 34 can be opposite the second axial direction 38. For example, the differential portion 28 can include a ledge 96 at each distal end 92, 94 that each incline radially inwardly as they extend axially from the a corresponding distal end 92, 94 and toward the differential 14 on the second side 88. For example, a first ledge may be provided for defining the first chamber 44, and a second ledge may be provided for defining the second chamber 48. The tapering of the ledges 96 from the corresponding distal end 92, 94 toward the proximal portion 30 can facilitate fluid flow to or from the differential 14.

Referring more particularly to FIG. 3, the differential case 20 is rotatably supported in the housing via bearing assemblies 97 between the differential 14 and the differential portion 28. The differential case 20 interacts with inner gearing 98 disposed in the differential case 20. The inner gearing 98 can include side gears 100, worm gears 102, planetary gears, or other gears that operably couple with the shafts 72 received by the differential 14. The inner gearing 98 and the differential case 20 define a gear interaction space 22 therebetween through which lubricant can flow to lubricate the inside of the differential case 20. The gear interaction space 22 can have a generally annular shape bounded at an inner diameter by the side gears 100 and an outer diameter by the differential case 20 between flanges 108, 110 of the differential case 20. The flanges 108, 110 define at least one passage 104, 106 that provides fluid communication into and/or out of the interaction space. For example, a first flange 108 can define at least one first passage 104 adjacent the first chamber 44, and a second flange 110 can define at least one second passage 106 adjacent the second chamber 48. A catcher ring 112 is disposed on the axis 18 and adjacent to the first flange 108 of the differential case 20. The catcher ring 112 includes at least one tube 114 that engages the at least one first passage 104 and provides an entry into the at least one first passage 104 from the first chamber 44. The catcher ring 112 can guide fluid from the first chamber 44 radially inwardly to the first passages 104.

The differential portion 28 includes a first protruding portion 116 radially opposite the first chamber 44 and a second protruding portion 118 radially opposite the second chamber 48 each on the second side 88 of the differential portion 28. For example, spaces defined by the differential portion 28 above the differential 14 (e.g., the first and second chambers 44, 48) can be larger (e.g., have a greater volume) than space below the differential 14. The first and second protruding portions 116, 118 define axial limits of the sump 40 such that oil in the sump 40 is configured to move into or out of the sump 40 via circumferential displacement. For example, the protruding portions 116, 118 can couple with the central wall 82 on the first side 86 of the differential 14 to axially bound an outer space 119 defined between the central wall 82 and the drive gear 16. Teeth 120 of the drive gear 16 can divide the outer space 119 into segments 122 such that, when the drive gear 16 rotates, the segments 122 also rotate and move the fluid.

Figure 4:
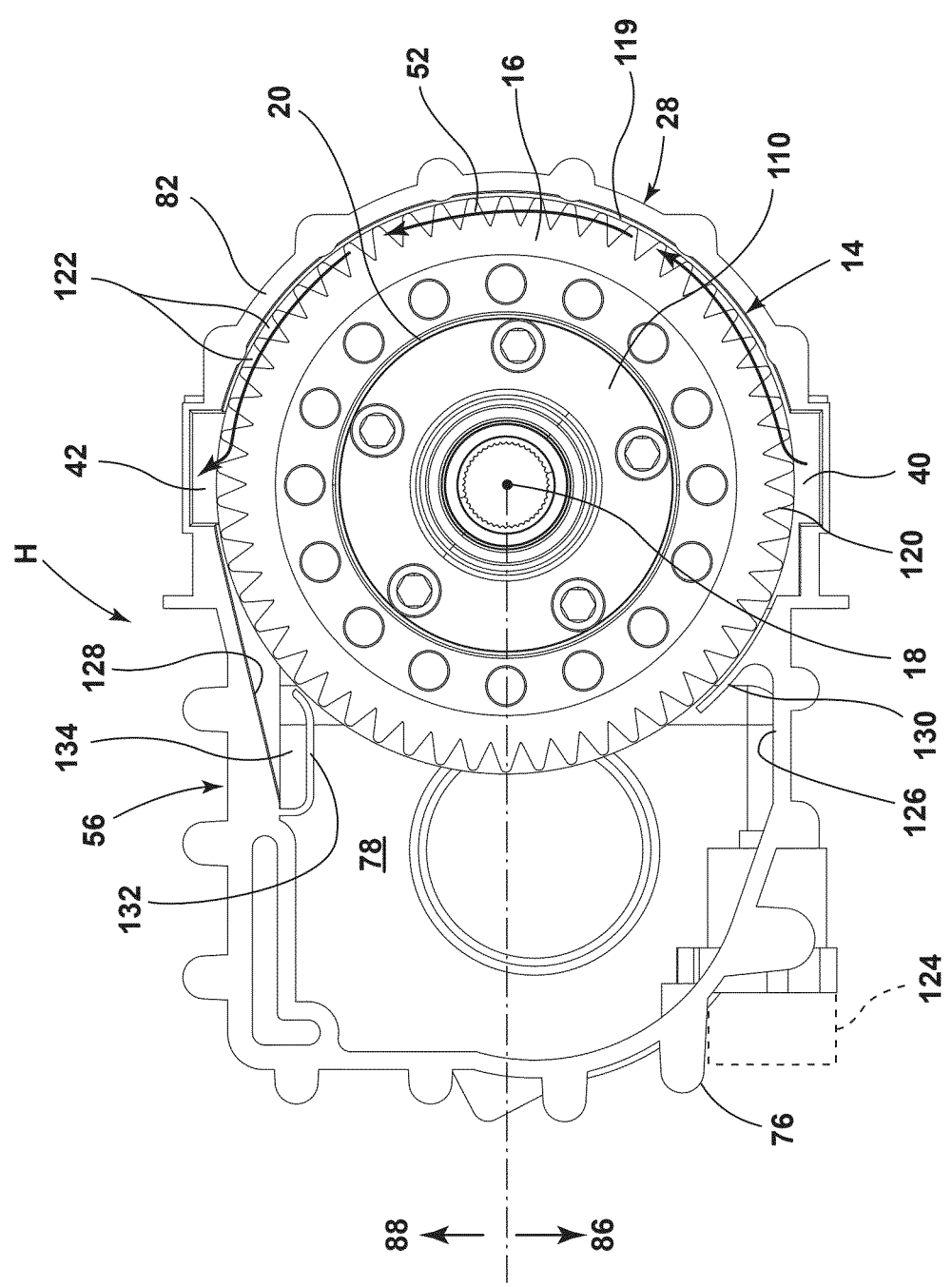
FIG. 4 is a side plan view of the portion of the axle assembly of FIG. 2 with a shell of a housing apparatus of the axle assembly removed demonstrating an interior of the housing apparatus and with at least a gear assembly and an electric drive unit omitted.
Figure 5:
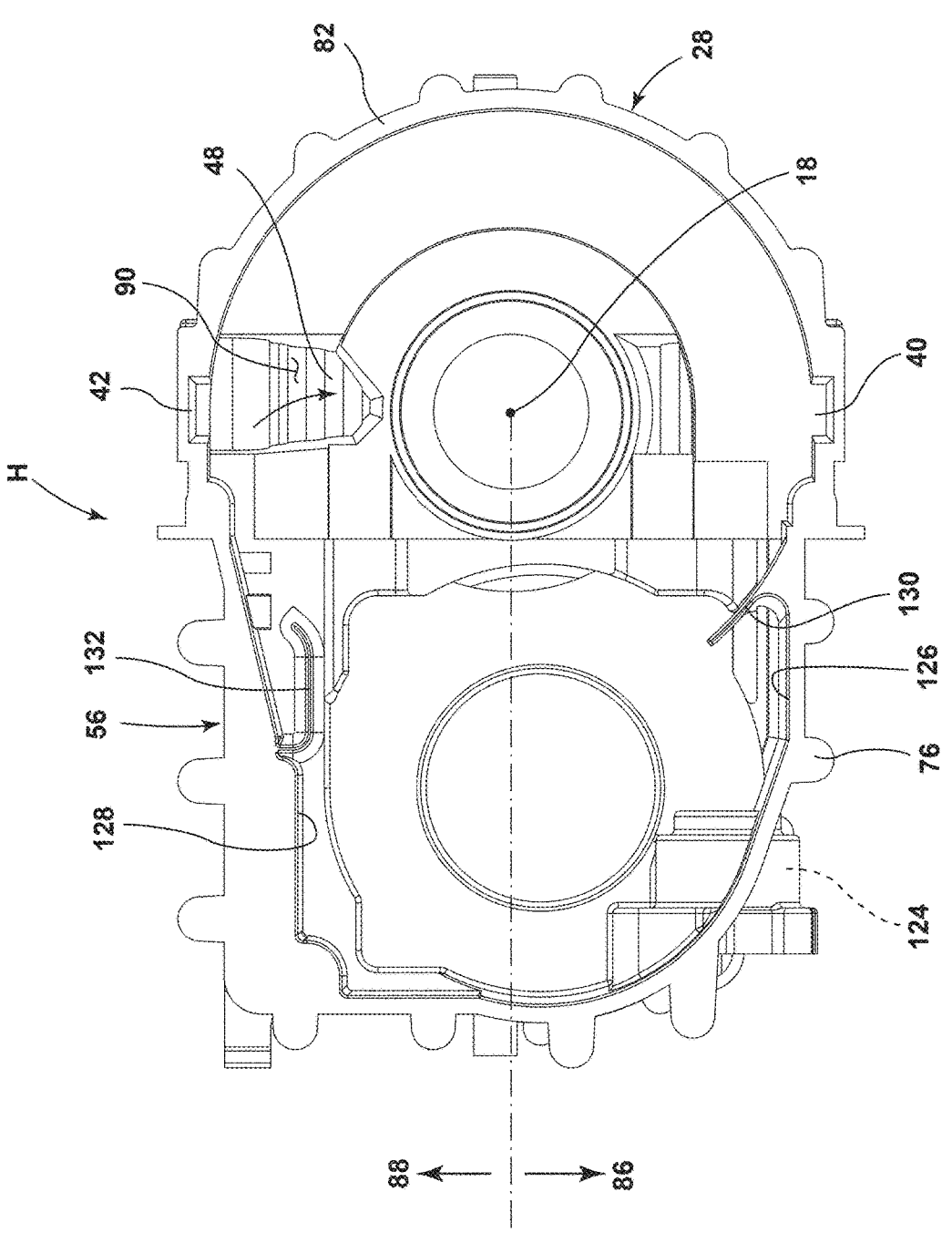
FIG. 5 is a side plan view of the portion of the axle assembly as shown in FIG. 4 with a differential omitted.

Referring to FIGS. 4 and 5, one or more pumps 124 can be provided for pressurizing fluid in the interior 78. The fluid can be pumped to different areas of the differential portion 28 and/or the drive portion 56. The differential portion 28 and the drive portion 56 cooperate to form a floor 126 and a ceiling 128 opposite the floor 126. A first guide 130 can extend from the floor 126, and a second guide 132 can extend from the ceiling 128. The first guide 130 extends circumferentially from the floor 126 about the axis 18 between the drive portion 56 and the differential portion 28 for guiding fluid between the differential 14 and the differential portion 28. Thus, the sump 40 can extend between the differential portion 28 and the drive portion 56. The sump 40 can thus be divided by the first guide 130 into a first region in the drive portion 56 and a second region in the differential portion 28. The second guide 132 can extend from the ceiling 128 in the drive portion 56 and act as a catch for fluid that can be recirculated. For example, the second guide 132 can define a void 134 in which oil can accumulate after being carried up by the drive gear 16 and be recirculated to the pump 124.

Referring now to FIG. 5, the cutaway view of the second shell 76 of the housing H illustrates the fluid communication between the cavity 42 and the second chamber 48. As shown, each chamber 44, 48 can taper toward the corresponding distal end 92, 94 to allow lubricant to lubricate the interior 78 at distal parts of the differential portion 28.

The geometry of the housing H and the arrangement of the housing H relative to the drive gear 16 can assist in lubrication of the differential 14 and the gear assembly. An exemplary fluid flow path 52 for lubricant oil is demonstrated in FIGS. 3, 4 and 6 and is demonstrated in view of rotation of the differential 14. The fluid flow path 52 extends from the sump 40 (FIG. 4), circumferentially between the drive gear 16 and the proximal portion 30 and to the cavity 42 (FIG. 4), from the cavity 42 in the first axial direction 34 into the first chamber 44 (FIG. 3), from the first chamber 44 in the second axial direction 38 into the gear interaction space 22 (FIG. 3), and from the gear interaction space 22 into the second chamber 48 (FIG. 3). The fluid flow path 52 may extend back to sump 40 and/or the outer space 119 and/or the void 134.

Figure 6:
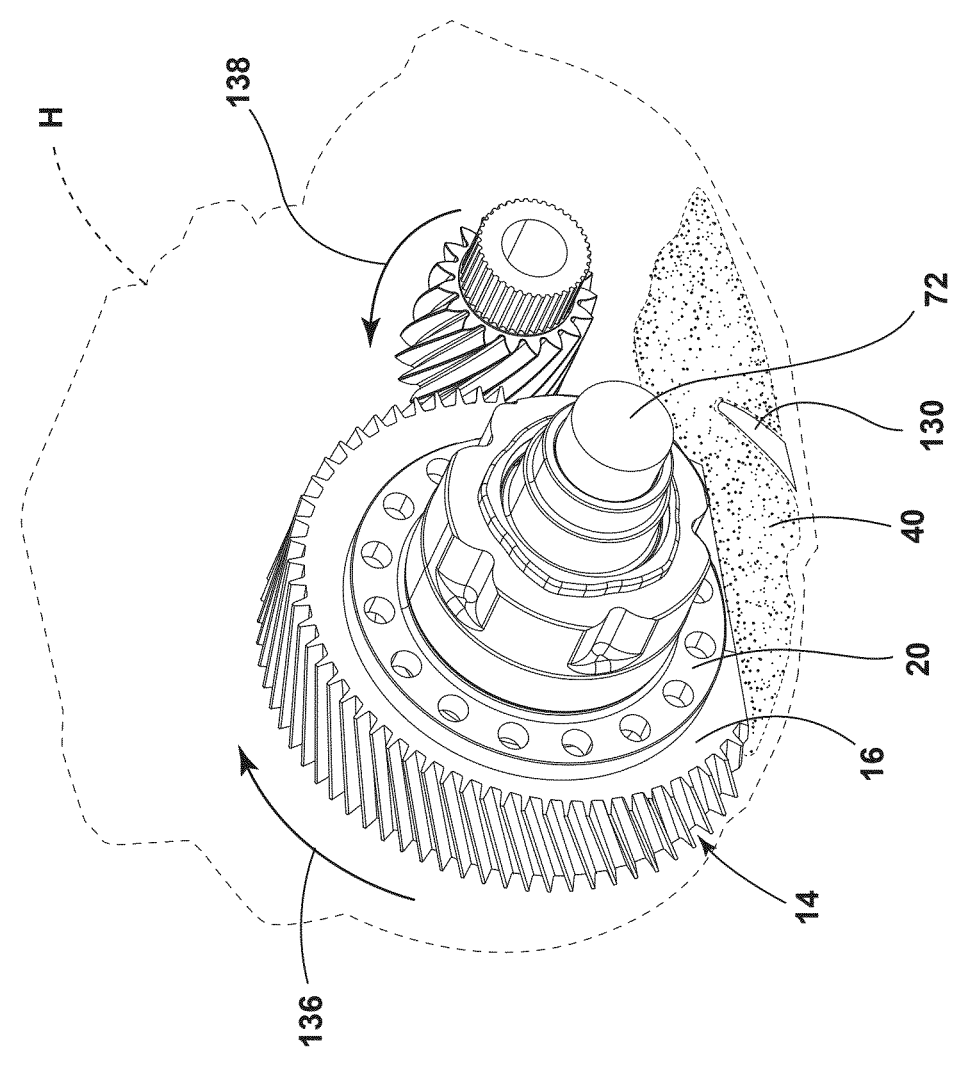
FIG. 6 is a perspective view of the portion of the axle assembly of FIG. 2 with a housing apparatus presented in phantom and demonstrating fluid distribution in a non-use state of the differential.
Figure 7:
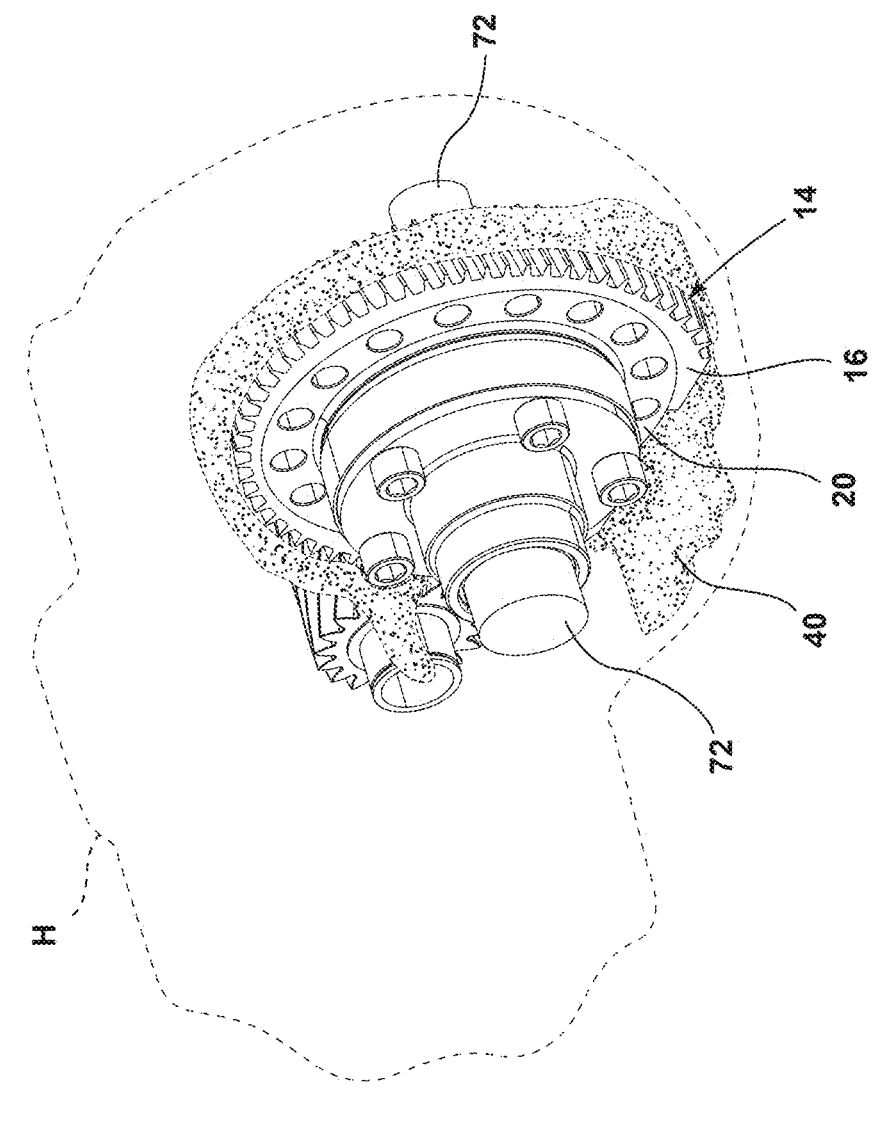
FIG. 7 is a perspective view of the portion of the axle assembly of FIG. 2 with a housing apparatus presented in phantom and demonstrating fluid distribution in a use state of the differential; and The components in the figures are not necessarily to scale, emphasis instead being placed upon illustrating the principles described herein.

In operation, movement of the differential 14 can cause fluid to move upward from the sump 40 into the cavity 42, the first chamber 44, and the second chamber 48. For example, operation of the motor 60 can cause rotation of the differential 14 via operation of the gear system 68. Rotation of the differential 14 and the drive gear 16 causes fluid in the sump 40 to be drawn circumferentially through the outer space 119 between the differential 14 gear and the differential portion 28 and into the cavity 42 where it is then distributed in the first axial direction 34. FIGS. 6 and 7 demonstrate transition from non-use (FIG. 6) in which fluid is settled in the sump 40, to use (FIG. 7) in which fluid is dispersed along the fluid flow path 52 and splashed into the chambers 44, 48, the cavity 42, the gear interaction space 22, and other space within the interior 78. An exemplary distribution of the fluid is demonstrated in dashed/dotted portions of FIGS. 6 and 7. The arrows in FIG. 6 demonstrate the motion of the drive gear 16 (first arrow 136) in response to motion of the gear assembly (second arrow 138). The drive gear 16 can be operable to passively lubricate the interior 78, and the geometry of the housing H can guide fluid in and around the differential 14. In this way, the drive gear 16 and the differential portion 28 can contact fluid (e.g., hydraulic oil) to form a passive lubrication system.

In general, the axle assembly 10 described herein may direct oil to multiple places inside the housing H without excessive use of pumps and/or with lower-power and lower-cost pumps. The gear teeth 120 can interact with the differential 14 to pressurize the fluid to allow the oil to reach distal areas of the housing and provide strong circulation through the differential case 20. By providing various features that can be integrally formed in the housing H (e.g., the guides 130, 132, the outer space 119, the cavity 42, the chambers 44, 48, the ledges 96), the need for components not unitarily-formed in the housing can be limited and cost can be reduced.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS 10 axle assembly
12 vehicle
14 differential
16 drive gear
18 axis
20 differential case
22 gear interaction space
24 first axial position
26 second axial position
H housing
28 differential portion

9

30 proximal portion
32 first distal portion
34 first axial direction
36 second distal portion
38 second axial direction
40 sump
42 cavity
44 first chamber
46 third axial position
48 second chamber
50 fourth axial position
52 fluid flow path
56 drive portion
58 drive unit
60 motor
62 rotor shaft
64 drive axis
66 wheel
68 gear system
70 transmission
72 shafts
74 first shell
76 second shell
78 interior
80 opening
82 central wall
84 outer wall
86 first side
88 second side
90 inner surface
92 first distal end
94 second distal end
96 ledge
97 bearing assemblies
98 inner gearing
100 side gear
102 worm gear
104 first passage
106 second passage
108 first flange
110 second flange
112 catcher ring
114 tube
116 first protruding portion
118 second protruding portion
119 outer space
120 teeth
122 segments
124 pump
126 floor
128 ceiling
130 first guide
132 second guide
134 void
136 first arrow
138 second arrow

What is claimed is:

1. An axle assembly for a vehicle, comprising:
a differential including a drive gear rotatable about an axis and a differential case coupled with and radially inboard of the drive gear and defining a gear interaction space extending axially between a first axial position and a second axial position; and
a housing that includes a differential portion having a proximal portion in which the drive gear is housed, a first distal portion extending in a first axial direction from the proximal portion, and a second distal portion extending in a second axial direction from the proximal portion, wherein the differential portion defines:
a sump in the proximal portion and disposed radially outboard of the drive gear;
a cavity in the proximal portion and radially opposite of the sump;
a first chamber extending in the first axial direction to a third axial position spaced distally from the first axial position; and
a second chamber extending in the second axial direction to a fourth axial position spaced distally from the second axial position,
wherein the differential portion and the differential form a fluid flow path extending from the sump, circumferentially between the drive gear and the proximal portion and to the cavity, from the cavity in the first axial direction into the first chamber, and from the first chamber in the second axial direction into the gear interaction space, and from the gear interaction space into the second chamber.

2. The axle assembly of claim 1, wherein the proximal portion and the drive gear define an outer space therebetween, wherein rotation of the drive gear causes fluid in the sump to move through the outer space and into the cavity.

3. The axle assembly of claim 1, comprising:
a catcher ring adjacent to the differential case, wherein the differential case defines a passage through which the fluid flow path extends between the first chamber and the gear interaction space, wherein the catcher ring comprises:
a tube that engages the passage and provides an entry into the passage from the first chamber.

4. The axle assembly of claim 1, wherein the differential portion is configured to be supported by the vehicle in an orientation such that the sump is disposed below the axis for collecting fluid.

5. The axle assembly of claim 4, comprising:
a motor; and
a drive portion coupled with the differential portion and in which a gear assembly is disposed, wherein operation of the motor causes rotation of the differential via operation of the gear assembly.

6. The axle assembly of claim 5, wherein the differential portion and the drive portion cooperate to form a floor and a ceiling opposite the floor, and comprising:
a guide extending circumferentially from the floor about the axis between the drive portion and the differential portion.

7. The axle assembly of claim 1, wherein the first chamber narrows from the cavity to a first distal end and the second chamber narrows from the cavity to a second distal end.

8. The axle assembly of claim 7, wherein the differential portion includes a ledge extending from the first distal end and tapering toward the differential case to guide fluid radially inwardly in the second axial direction to the differential case.

9. The axle assembly of claim 1, wherein a first plane passes through the axis, the sump, and the cavity, and wherein a second plane is orthogonal to the first plane and passes through the axis, the second plane dividing the differential portion into a first side in which the sump is disposed and a second side in which the cavity, the first chamber, and the second chamber are disposed.

10. The axle assembly of claim 9, wherein the differential portion includes a first protruding portion radially opposite the first chamber and a second protruding portion radially opposite the second chamber, each protruding portion disposed on the first side of the differential portion.

11. The axle assembly of claim 10, wherein the first and second protruding portions define axial limits of the sump such that oil in the sump is configured to move out of the sump via circumferential displacement.

12. An axle assembly, comprising:
a motor;
a differential including a drive gear rotatable about an axis and a differential case radially inboard of the drive gear defining a gear interaction space inside the differential case and extending between a first axial position and a second axial position;
a gear assembly operably coupled with the motor; and
a housing including:
a drive portion in which the gear assembly is disposed, wherein operation of the motor causes rotation of the differential via operation of the gear assembly; and
a differential portion having a proximal portion in which the drive gear is housed, wherein the proximal portion and the drive gear define an outer space therebetween, wherein rotation of the drive gear causes fluid in the sump to move through the outer space and into the cavity, wherein the differential portion defines:
a sump in the proximal portion and disposed radially outboard of the drive gear;
a cavity in the proximal portion and radially opposite of the sump;
a first chamber extending from the cavity in a first axial direction to a third axial position spaced distally from the first axial position; and
a second chamber extending from the cavity in a second axial direction to a fourth axial position spaced distally from the second axial position,
wherein the differential portion and the differential form a fluid flow path extending from the sump, circumferentially between the drive gear and the proximal portion and to the cavity, from the cavity in the first axial direction into the first chamber, and from the first chamber in the second axial direction into the gear interaction space, and wherein the drive gear has teeth that extend radially outwards from the outer circumference of the drive gear and that divide the outer space into segments, such that when the drive gear rotates, the segments rotate and move the fluid.

13. The axle assembly of claim 12, comprising:
a catcher ring adjacent to the differential case, wherein the differential case defines a passage through which the fluid flow path extends between the first chamber and the gear interaction space, wherein the catcher ring partially engages the passage.

14. The axle assembly of claim 12, wherein the differential portion includes a first distal portion extending in a first axial direction from the proximal portion and a second distal portion extending in a second axial direction from the proximal portion, wherein the first chamber narrows from the cavity toward a first distal end and the second chamber narrows from the cavity toward a second distal end.

15. The axle assembly of claim 14, wherein the differential portion includes a ledge extending from the first distal end and tapering toward the differential case to guide fluid radially inwardly in the second axial direction to the differential case.

16. The axle assembly of claim 12, wherein a first plane passes through the axis, the sump, and the cavity, and wherein a second plane is orthogonal to the first plane and passes through the axis, the second plane dividing the differential portion into a first side in which the sump is disposed and a second side in which the cavity, the first chamber, and the second chamber are disposed.

17. The axle assembly of claim 16, wherein the differential portion includes a first protruding portion radially opposite the first chamber and a second protruding portion radially opposite the second chamber, each of the protruding portions disposed on the first side of the differential portion, and wherein the first protruding portion and the second protruding portion extend substantially orthogonal to the axis.

18. The axle assembly of claim 17, wherein the first and second protruding portions define axial limits of the sump such that oil in the sump is configured to move into or out of the sump via circumferential displacement.

19. An axle assembly for a vehicle, comprising:
a differential including a drive gear rotatable about an axis and a differential case coupled with the drive gear and defining a gear interaction space inside the differential case; and
a housing in which the drive gear is housed and including a ledge, the housing defining:
a sump disposed radially outboard of the drive gear;
a cavity opposite the sump; and
a chamber extending in a first axial direction and narrowing from the cavity toward a distal end of the housing, wherein the ledge extends from the distal end and tapers radially inwardly in a second axial direction opposite the first axial direction from the distal end toward the differential case to guide fluid toward the differential case.

20. The axle assembly of claim 19, wherein the housing is formed of a differential portion and a drive portion, and wherein the differential portion and the drive portion cooperate to form a floor and a ceiling opposite the floor, and wherein the axle assembly further comprises:
a guide extending circumferentially from the ceiling in the drive portion, and wherein the second guide defines a void in which oil can accumulate after being carried by the drive gear.

* * * * *